United States Patent
Johansson et al.

(10) Patent No.: US 10,346,008 B2
(45) Date of Patent: Jul. 9, 2019

(54) PERSONALIZED TIMELINE PRESENTATION

(71) Applicant: MobiTV, Inc., Emeryville, CA (US)

(72) Inventors: Kay Johansson, Alamo, CA (US); Cedric Fernandes, San Ramon, CA (US)

(73) Assignee: MobiTV, Inc., Emeryville, CA (US)

( * ) Notice: Subject to any disclaimer, the term of this patent is extended or adjusted under 35 U.S.C. 154(b) by 202 days.

(21) Appl. No.: 15/622,275

(22) Filed: Jun. 14, 2017

(65) Prior Publication Data

US 2017/0277405 A1    Sep. 28, 2017

Related U.S. Application Data

(63) Continuation of application No. 14/306,221, filed on Jun. 16, 2014, now Pat. No. 9,715,334, which is a continuation of application No. 13/591,493, filed on Aug. 22, 2012, now Pat. No. 8,793,582.

(51) Int. Cl.
| | |
|---|---|
| *G06F 3/048* | (2013.01) |
| *G06F 3/0484* | (2013.01) |
| *G06F 16/70* | (2019.01) |
| *G06F 3/16* | (2006.01) |
| *H04L 29/06* | (2006.01) |

(52) U.S. Cl.
CPC .......... *G06F 3/04842* (2013.01); *G06F 3/167* (2013.01); *G06F 16/70* (2019.01); *H04L 65/60* (2013.01)

(58) Field of Classification Search
CPC ...... G06F 3/04842; G06F 16/70; G06F 3/167; H04L 65/60
USPC .......................................................... 715/719
See application file for complete search history.

(56) References Cited

U.S. PATENT DOCUMENTS

| | | | |
|---|---|---|---|
| 6,628,303 | B1 | 9/2003 | Foreman et al. |
| 7,356,242 | B2 * | 4/2008 | Nagasawa ............ G11B 27/034 360/13 |
| 7,518,650 | B2 | 4/2009 | Miyamoto |
| 8,117,252 | B2 | 2/2012 | Schaff |
| 8,793,582 | B2 | 7/2014 | Johansson et al. |
| 8,873,930 | B2 | 10/2014 | Deglise et al. |
| 9,454,993 | B1 | 9/2016 | Lawson et al. |
| 9,635,398 | B2 * | 4/2017 | Ionescu .................. G06Q 30/00 |
| 9,654,360 | B1 * | 5/2017 | Kellicker ................ H04L 43/06 |
| 9,715,334 | B2 * | 7/2017 | Johansson ............... G06F 3/167 |

(Continued)

OTHER PUBLICATIONS

"[MS-RTSP]: Real-Time Streaming Protocol (RTSP) Windows Media Extensions", Microsoft Corporation, 2012-07-05 00:00:00.0.

(Continued)

*Primary Examiner* — David Phantana-angkool
(74) *Attorney, Agent, or Firm* — Kwan & Olynick LLP

(57) ABSTRACT

Described herein are techniques and mechanisms for personalized timeline presentation. Client devices may be presented with video content in association with a content management account. A video content item may be associated with more than one pause point, with each pause point indicating a time at which playback of the video content item was paused. Different profiles associated with the content management account may be associated with different pause points for the same video content item. Playback of the video content item may be resumed at one of the pause points when one of the profiles is selected.

20 Claims, 8 Drawing Sheets

(56) References Cited

U.S. PATENT DOCUMENTS

| | | | |
|---|---|---|---|
| 9,756,549 B2 * | 9/2017 | Perdomo | H04W 40/12 |
| 9,788,084 B2 * | 10/2017 | Einstein | H04N 21/2353 |
| 2003/0007663 A1 | 1/2003 | Wixson et al. | |
| 2011/0116766 A1 | 5/2011 | Sie et al. | |
| 2012/0173980 A1 | 7/2012 | Dachs | |
| 2012/0239661 A1 | 9/2012 | Giblin | |
| 2013/0051754 A1 | 2/2013 | Gilpin | |
| 2013/0205212 A1 | 8/2013 | Sinha et al. | |
| 2014/0059432 A1 | 2/2014 | Johansson et al. | |
| 2014/0285717 A1 | 9/2014 | Cai | |
| 2014/0298175 A1 | 10/2014 | Johansson et al. | |
| 2017/0104707 A1 | 4/2017 | Bonifay | |

OTHER PUBLICATIONS

"U.S. Appl. No. 13/591,493, Non Final Office Action dated Jan. 31, 2014", 5 pgs.

"U.S. Appl. No. 13/591,493, Notice of Allowance dated Apr. 16, 2014", 6 pgs.

"U.S. Appl. No. 14/306,221, Non Final Office Action mailed May 4, 2017", 7 pgs.

"U.S. Appl. No. 14/306,221, Notice of Allowance dated May 26, 2017", 6 pgs.

"ATSC Digital Television Standard: Part 4—MPEG-2 Video System Characteristics", Advanced Television Systems Committee, Inc., [Online]. Retrieved from the Internet: < http://www.atsc.org/cms/standards/a53/a_53-Part-4-2009.pdf >, 2009-08-07 00:00:00.0.

"MPEG-4—The Media Standard",[Online]. Retrieved from the Internet: < http://www.m4if.org/public/documents/vault/m4-out-20027.pdf >, 2002-11-19 00:00:00.0.

Akram, A,"RTP Media Stream Pause and Resume", IETF Trust, [Online]. Retrieved from the Internet: < http://tools.ietf.org/pdf/draft-westerlund-avtext-rtp-stream-pause-02.pdf >, 2012-07-16 00:00:00.0.

Pantos, R, "HTTP Live Streaming: draft-pantos-http-live-streaming-08", [Online]. Retrieved from the Internet: < http://tools.ietf.org/pdf/draft-pantos-http-live-streaming-08.pdf >, Accessed on Jul. 17, 2012, 2012-03-01 00:00:00.0.

Schulzrinne, H , "Real Time Streaming Protocol (RTSP)", The Internet Society, [Online]. Retrieved from the Internet: < http://tools.ietf.org/pdf/draft-ietf-mmusic-rfc2326bis-29.pdf >, Accessed on Jul. 17, 2012, 1998-02-01 00:00:00.0.

Schulzrinne, H. , "RTP: A Transport Protocol for Real-Time Applications", The Internet Society, 1905-06-25 00:00:00.0.

Siglin, Timothy, "Unifying Global Video Strategies: MP4 File Fragmentation for Broadcast, Mobile and Web Delivery", White Paper, Transitions in Technology, [Online]. Retrieved from the internet: <http://184.168.176.117/reports-public/Adobe/20111116-fMP4-Adobe-Microsoft.pdf >, 2011-11-16 00:00:00.0.

Sullivan, Gary J., "The H.264/AVC Advanced Video Coding Standard: Overview and Introduction to the Fidelity Range Extensions", SPIE Conference on Applications of Digital Image Processing XXVII, Special Session on Advances in the New Emerging Standard, [Online]. Retrieved from the Internet: < http://www.fastvdo.com/spie04/spie04-h2640verviewPaper.pdf >, 2004-08-01 00:00:00.0.

* cited by examiner

PERSONALIZED TIMELINE PRESENTATION

CROSS-REFERENCE TO RELATED APPLICATIONS

This application is a continuation of and claims priority to U.S. patent application Ser. No. 14/306,221, titled "PERSONALIZED TIMELINE PRESENTATION", filed Jun. 16. 2014 by Kay Johansson and Cedric Fernandes, which is a continuation of and claims priority to U.S. patent application Ser. No. 13/591,493, titled "PERSONALIZED TIMELINE PRESENTATION", filed Aug. 22, 2012 by Kay Johansson and Cedric Fernandes, now U.S. Pat. No. 8,793,582, issued on Jul. 29, 2014, both of which are incorporated herein by reference in their entirety and for all purposes.

TECHNICAL FIELD

The present disclosure relates to the pausing and resuming of content playback.

DESCRIPTION OF RELATED ART

When content such as a movie or television show are presented on a device, a user may indicate a request to pause playback of the content. Then, the timing at which playback of the content is paused may be captured and stored. For instance, the user may be viewing streaming content via the Internet, and the playback of the content may be associated with a user account at a content provider. In this case, the timing at which playback of the content is paused may be stored on a server configured to provide content management and/or playback services. Then, when the user resumes playback of the content later, playback may be resumed at the point in time at which playback was previously paused.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
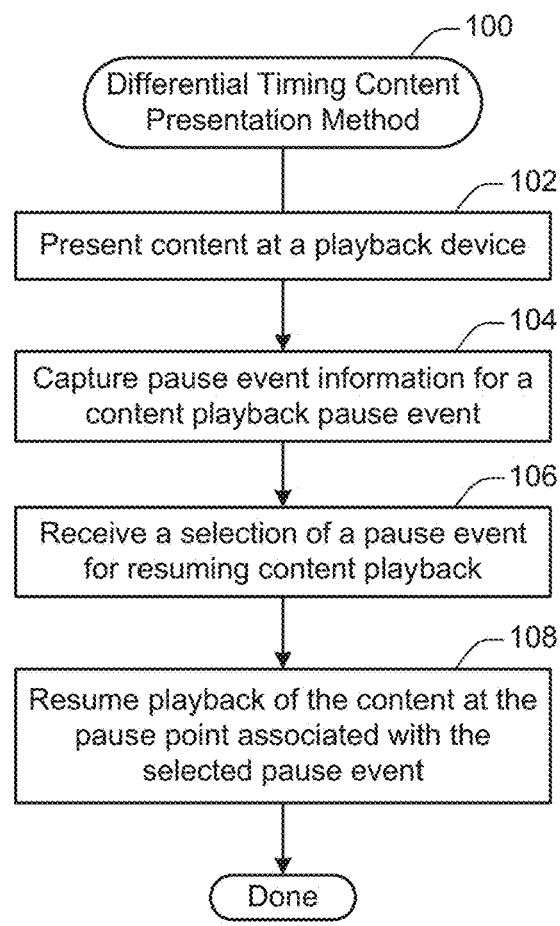
FIG. 1 illustrates one example of a method for presenting content with differential timing.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that sonic embodiments include multiple iterations of a technique or multiple instantiations of a mechanism unless noted otherwise. For example, a system uses a processor in a variety of contexts. However, it will be appreciated that a system can use multiple processors While remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A content management account may provide a unified way of viewing content on a variety of devices and from a variety of sources. In many cases, a content management account may be shared by several users such as members of the same family. These users may sometimes view the same content, either alone or in groups.

In some instances, a user viewing content may wish to pause the content and resume playback later. Accordingly, the system may identify a time at which content playback is paused so that content playback may later be resumed at the same time. However, when several users share the same account, different users may wish to pause and resume playback at different points for the same content item.

According to various embodiments, more than one pause point may be created for a content item. Each pause point may be linked with a different profile associated with the content management account. When playback of the content item is initiated, a user interface may provider viewers with the opportunity to select a particular pause point for resuming playback.

Example Embodiments

FIG. 1 illustrates one example of a method 100 for presenting content with differential timing. According to various embodiments, the method 100 may be used to present content at a playback device, capturing information regarding one or more pause events during content playback, and later resuming playback when one or more of the pause events are selected. The method 100 may be performed at a content playback device, at a server potentially in communication with many content playback devices, or at some combination thereof.

At 102, content is presented at a playback device. According to various embodiments, the content may be video content, audio content, and/or any other type of content. For instance, the content may be a movie, a television program, a music album, or an audiobook.

According to various embodiments, the content may be received from various sources. For example, the content may be streamed or downloaded via a network such as the Internet from a content provider. As another example, the content may be received from a local or network storage location. As yet another example, the content may be received via a cable or satellite television network connection.

At 104, pause event information for a content playback pause event is captured. According to various embodiments, capturing pause event information may involve identifying various types of information. This information may include, but is not limited to: a time at which playback is paused, one or more user profiles associated with the pause event, one or more group profiles associated with the pause event, and one or more devices associated with the pause event. Techniques for capturing pause event information for a content playback pause event are discussed in additional detail with respect to FIG. 3.

According to various embodiments, information regarding more than one content playback pause event may be captured. For example, content playback may be paused for one user while a second user continues watching. Later, the second user may also pause playback. As another example, two users associated with the same content management account may separately view content and separately pause playback at two different points in the content.

At 106, a selection of a pause event for resuming playback is received. According to various embodiments, the selection may be received from a user input device associated with the playback device. For instance, the selection may be received via a touch screen, a mouse, a keyboard, eye tracking, or any other user input technique. Examples of user interfaces that may be used to display pause points and receive user input selecting a pause point are shown in FIGS. 10 and 11.

According to various embodiments, the selection of a pause event for resuming playback may be received at various times. For example, a user may pause playback for a brief period of time and then quickly resume playback. As another example, a user may pause playback and walk away from the device, not returning to continue viewing the content for weeks or months.

At 108, playback of the content is resumed at the pause point associated with the selected pause event. According to various embodiments, resuming playback may involve loading the video into a video player from a local or network storage location, presenting streaming video on demand received via a network, activating an audio stream, or any other content for presenting content. Techniques for resuming playback based on the selection of a pause point are discussed in additional detail with respect to FIG. 4.

Figure 2:
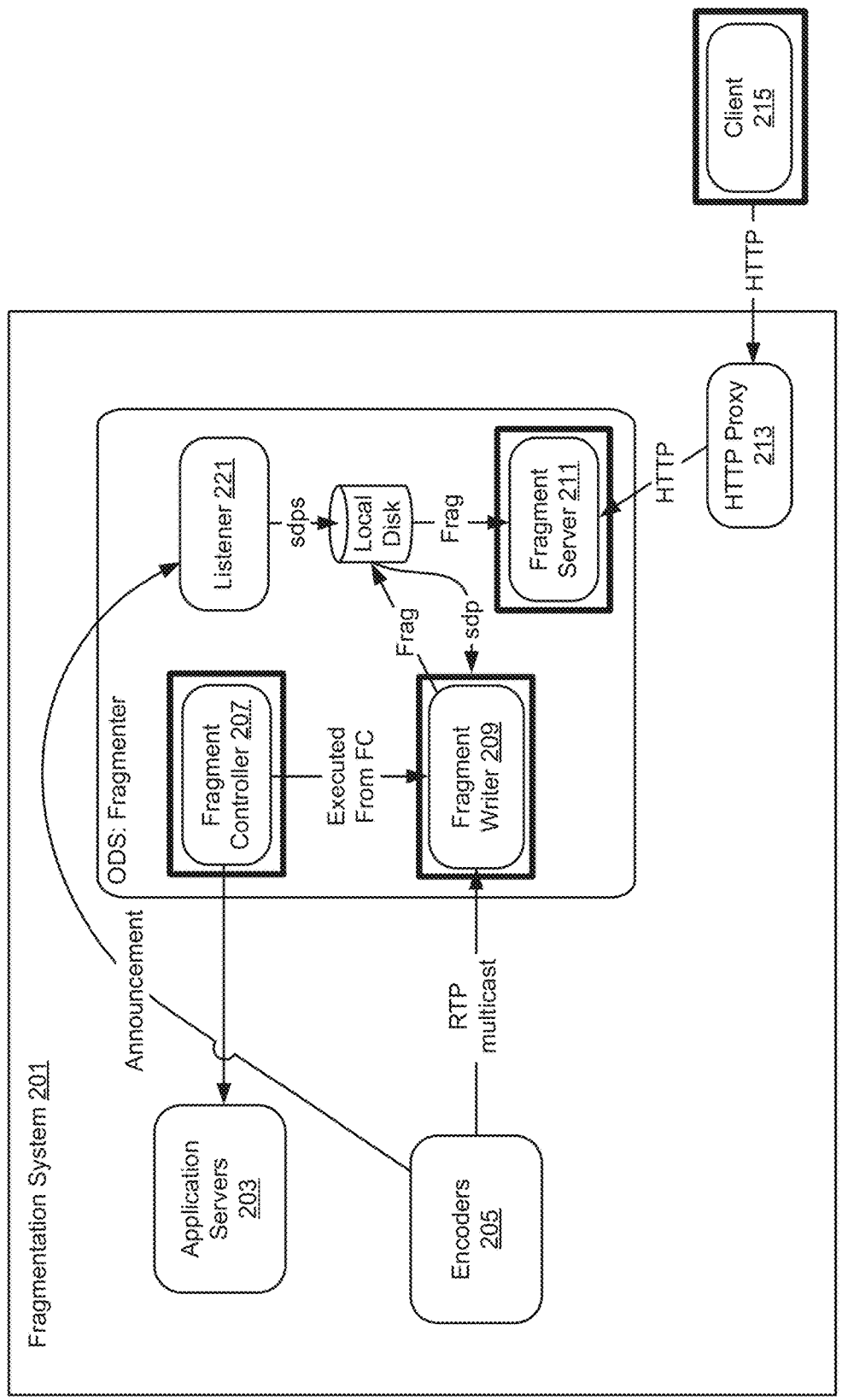
FIG. 2 illustrates one example of a system that can be used with various techniques and mechanisms of the present invention.

FIG. 2 is a diagrammatic representation illustrating one example of a fragment or segment system 201 associated with a content server that may be used in a broadcast and unicast distribution network. Encoders 205 receive media data from satellite, content libraries, and other content sources and sends RTP multicast data to fragment writer 209. The encoders 205 also send session announcement protocol (SAP) announcements to SAP listener 221. According to various embodiments, the fragment writer 209 creates fragments for live streaming, and writes files to disk for recording. The fragment writer 209 receives RTP multicast streams from the encoders 205 and parses the streams to repackage the audio/video data as part of fragmented MPEG-4 files. When a new program starts, the fragment writer 209 creates a new MPEG-4 file on fragment storage and appends fragments in particular embodiments, the fragment writer 209 supports live and/or DVR configurations.

The fragment system 201 is one example of a system that may be used for viewing, pausing, and resuming content playback. According to various embodiments, a fragment system may be used to encode content into fragments for streaming to a client device. While the content is being presented at the client device, playback may be paused. Later, when playback is resumed, the next unplayed fragment may be transmitted to the client machine. In particular embodiments, the application servers 203 and/or the HTTP proxy 213 may be used to receive, process, and/or store pause event information for resuming playback.

The fragment server 211 provides the caching layer with fragments for clients. The design philosophy behind the client/server application programming interface (API) minimizes round trips and reduces complexity as much as possible when it comes to delivery of the media data to the client 215. The fragment server 211 provides live streams and/or DVR configurations.

The fragment controller 207 is connected to application servers 203 and controls the fragmentation of live channel streams. The fragmentation controller 207 optionally integrates guide data to drive the recordings for a global/network DVR. In particular embodiments, the fragment controller 207 embeds logic around the recording to simplify the fragment writer 209 component. According to various embodiments, the fragment controller 207 will run on the same host as the fragment writer 209. In particular embodiments, the fragment controller 207 instantiates instances of the fragment writer 209 and manages high availability.

According to various embodiments, the client 215 uses a media component that requests fragmented MPEG-4 files, allows trick-play, and manages bandwidth adaptation. The client communicates with the application services associated with HTTP proxy 213 to get guides and present the user with the recorded content available.

Figure 3:
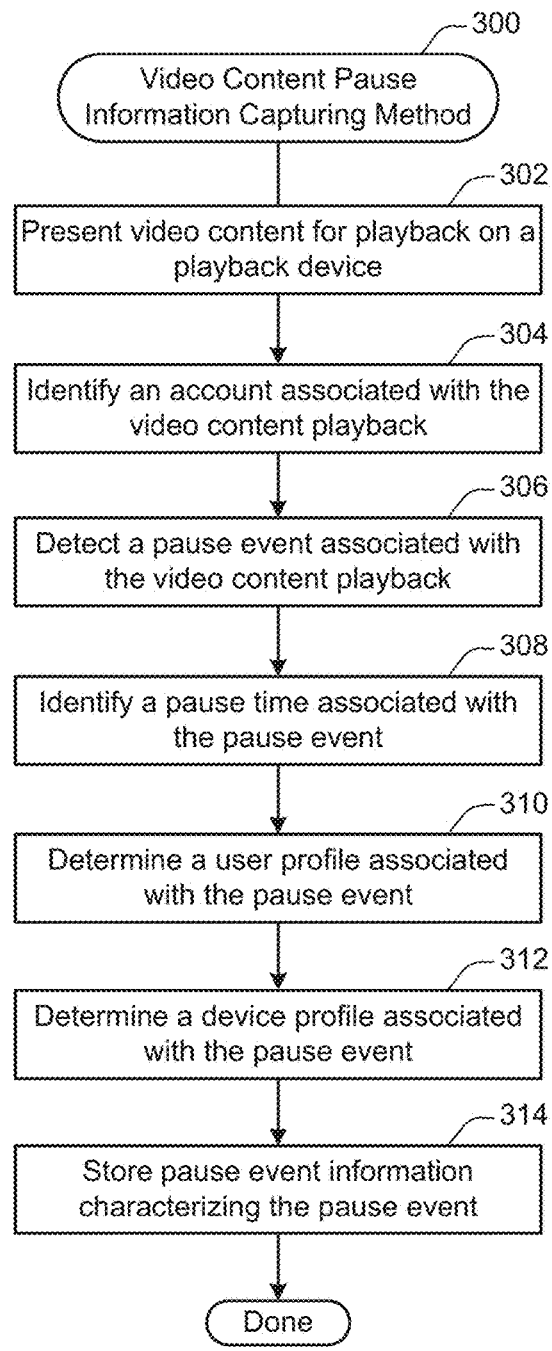
FIG. 3 illustrates one example of a method for capturing video content pause information.

FIG. 3 illustrates one example of a method 300 for capturing video content pause information. According to various embodiments, the method 300 may be performed at a content playback device or at a server in communication with a content playback device. In the method 300, content is presented on a content playback device. When a pause event is detected, information characterizing the pause event is captured and stored so that playback may be resumed at the same time.

At 302, video content is presented on a playback device. According to various embodiments, the content may be presented in association with a content management account. The content management account may be provided by a content management provider. The content management provider may facilitate the organization and transmission of content from a variety of sources to a variety of content playback devices. For example, the content management account may be used to organize live or video-on-demand content streamed over a network such as the Internet, content received via a cable or satellite television network. As another example, the content management account may be used to transmit content to devices such as televisions, computers, and mobile devices. As yet another example, the content management account may be used to manage the viewing of content stored on a local storage device or a network storage location.

Figure 4:
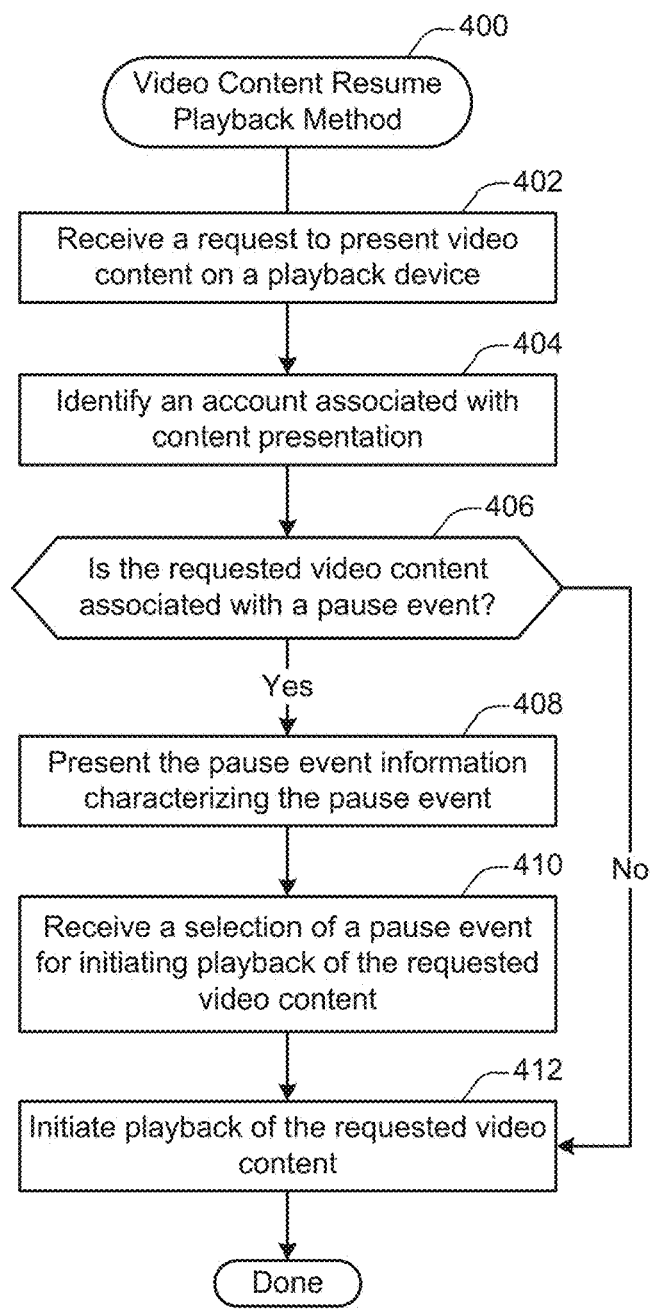
FIG. 4 illustrates one example of a method for resuming video content playback.

Although the content is described in FIGS. 3 and 4 as video content, in sonic instances other types of content may be presented. For example, audio content such as an audio book, a song, or a music album may be presented for playback.

At 304, an account associated with the video content playback is identified. According to various embodiments, the account may be a content management account, as discussed herein. In some cases, a device may be linked with a content management account. In particular embodiments, a user may provide login information identifying a content management account.

According to various embodiments, the account may be used at least in part for identifying a pause event. For instance, when watching a television show received via an on-demand network, a user may pause playback. Because the content playback is linked to a content management account, the pause event may be recorded. Then, when playback of the television show is resumed via the on-demand network or via any other content source, content playback may be resumed at the point at which it was paused.

At 306, a pause event associated with the video content playback is identified. According to various embodiments, the pause event may be any event that interrupts or terminates playback of the video content. For example, the pause event may be the detection of user input such as a button press, mouse click, or touch screen input requesting to pause the video content. As another example, the pause event may be the detection of a service interruption in a content stream received from a remote server when the video content is received by streaming. As yet another example, the pause event may be the detection of the content playback device being powered off, such as by a loss of battery power for a mobile device, the activation of a power off button by the user, or some other such occurrence.

In particular embodiments, playback of the content need not actually be paused in order for a pause event to be detected. For instance, in some situations several users may all be viewing content playback performed on a single device, such as a television. If one of the users wishes to walk away from the television while the others wish to continue to view the content, then the user may provide user input for indicating a pause event specific to the user. For example, the user may provide user input on the content playback device by selecting a profile associated with the user.

According to various embodiments, a pause event associated with the video content playback may be detected at a device other than the one on which content is being presented. For instance, a group of users may be viewing content on a device such as a television while one user is using a personal device such as a tablet computer or a mobile phone. The personal device may be displaying a connected user interface that is linked to the television and the content presented on the television. The connected user interface may present information related to the content presented on the television. For example, the information may include biographical information regarding cast or crew members, social media information related to the content, or suggestions regarding related content. In sonic instances, a user may indicate a desire to pause playback of content by providing user input on the personal device.

At 308, a pause time associated with the pause event is identified. According to various embodiments, the time may be measured relative to the length of the content. For instance, a time of 1:15 may indicate that the first one hour, 15 minutes of the content item has already been presented when playback is paused. Alternately, such a time may indicate that there is one hour, 15 minutes remaining in the playback of the content item after the pause point. In particular embodiments, an actual time associated with the pause event may also be identified. For instance, a system may discard pause events that occurred far in the past and only store the most recent pause events.

At 310, a user profile associated with the pause event is determined. According to various embodiments, a user profile may be associated with any user or group of users who views content in association with the account identified in operation 304. The user profile may be identified by a name, number, avatar, icon, and/or any other identification techniques.

According to various embodiments, the user profile may be determined based on user input. For example, a user may provide user input selecting a user profile from a list of profiles. As another example, user input may be provided via a playback device connected with the presentation of content. For instance, a group of users may be viewing content on a television. At the same time, one user may be viewing a connected user interface on a personal device such as a mobile phone. The connected user interface may display information related to the content presented on the television. In this case, the user of the personal device may indicate a desire to pause playback by providing user input at the personal device. When the user input is received, the pause event may be captured without interrupting playback of the content on the television.

According to various embodiments, the user profile may be determined automatically. For example, a pause event may be captured at a personal playback device linked to a user account. For instance, a group of users may be viewing content on a television while another user views a connected user interface on a personal device such as a mobile phone. The personal device may be linked with a user profile such that when a user of the device indicates a desire to pause playback, the pause event is automatically associated with the user profile.

At 312, a device profile associated with the pause event is determined. According to various embodiments, determining a device profile associated with the pause event may involve identifying a device on which the content is playing. For instance, a device may provide an identifier or other information to a content management server when playback is initiated. In particular embodiments, determining a device profile associated with the pause event may involve receiving user input selecting a device associated with the content management account identified in operation 304.

At 314, the pause event information characterizing the pause event is stored. According to various embodiments, the pause event information may be stored on a server in communication with the playback device. For instance, the pause event information may be stored on a server configured to provide content management services to many different client machines and for many different content management accounts. In particular embodiments, the pause event information may be stored on the playback device itself. For instance, the playback device may not be in communication with a remote server when the pause event is detected.

According to various embodiments, not all of the operations shown in FIG. 3 need be performed. For example, in some cases a pause event may be associated with a user profile as discussed with respect to operation 310 but not a device profile as discussed with respect to operation 312. As another example, in other cases the reverse may be true.

FIG. 4 illustrates one example of a method 400 for resuming video content playback. According to various embodiments, the method 400 may be performed at a playback device or at a server in communication with a playback device via a network. The method 400 may be used to identify a pause event for initiating content playback and resuming playback at the pause point associated with the pause event.

At 402, a request to present video content on a playback device is received. According to various embodiments, the request may be received at the playback device. The request may then be transmitted to a server configured to provide content management services. For example, the user may navigate to the content via a content management interface presented on the playback device. As another example, the user may select content via an electronic program guide.

At 404, an account associated with content presentation is identified. According to various embodiments, the presentation of video content may be associated with a content management account for managing the presentation of content received from various sources and presented on various devices. The content management account may be identified by receiving login information from a user or device, by identifying a characteristic of the device from which the request is received, or via any other identification technique.

At 406, a determination is made as to whether the requested video content is associated with a pause event. According to various embodiments, the determination may be made by analyzing pause event information associated with the content management account identified at operation 404.

In particular embodiments, the content need not be requested from the same source as the source from which it was originally received. For example, a user may have initially been watching a television program received via a cable television network. Then, the user may have paused playback of the television program, and information regarding the captured pause event may have been stored on a server. Next, the user may resume watching the same television program at a later date, but this time the user may elect to view the television program via an on-demand content streaming service, such as Netflix or Amazon. However, because the pause event was associated with the content in conjunction with the content management account that can be used to manage content received from various services, playback of the content may be resumed at the pause point.

Figure 6:
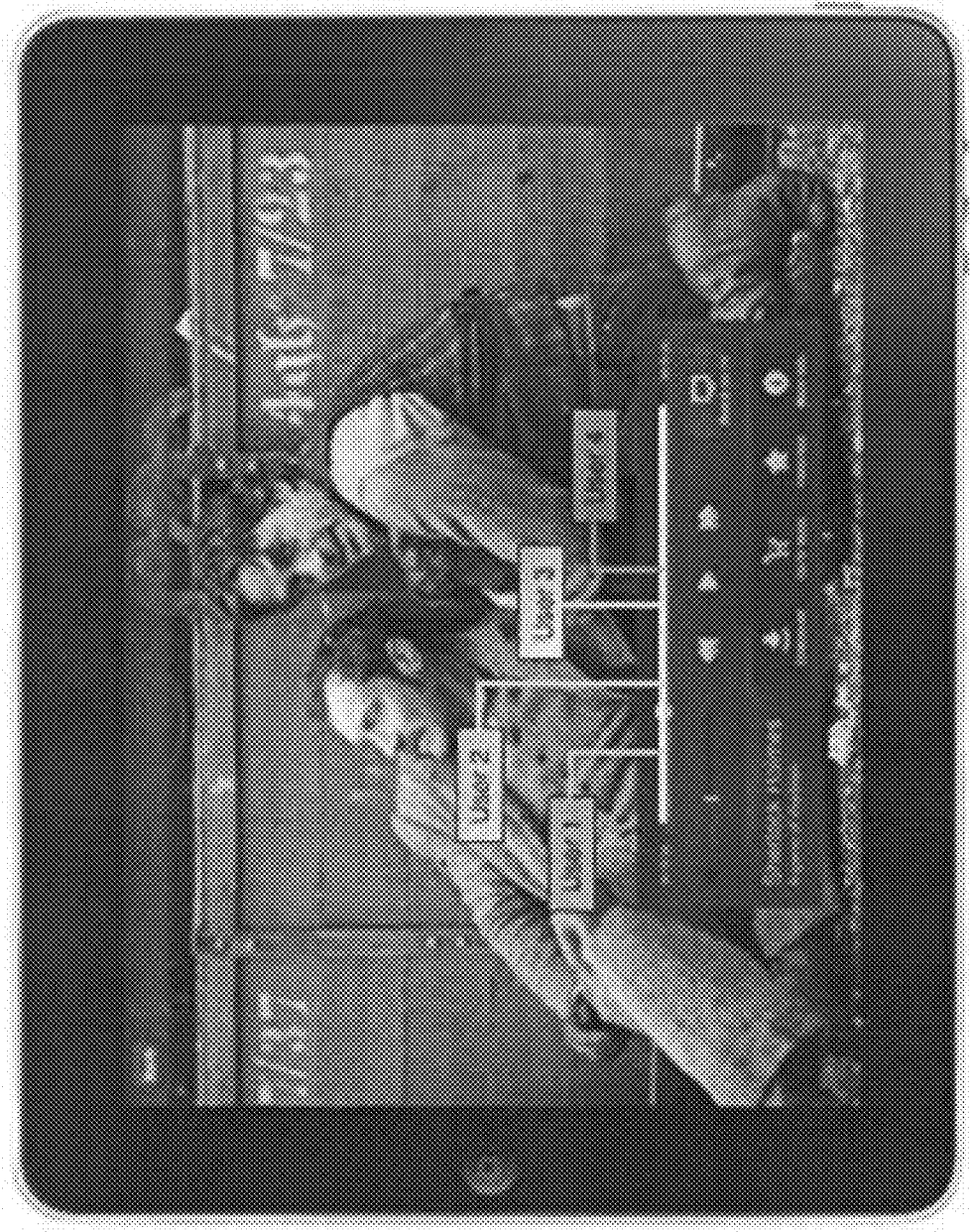
FIGS. 6 and 7 illustrate examples of user interfaces that can be used with various techniques and mechanisms of the present invention.
Figure 7:
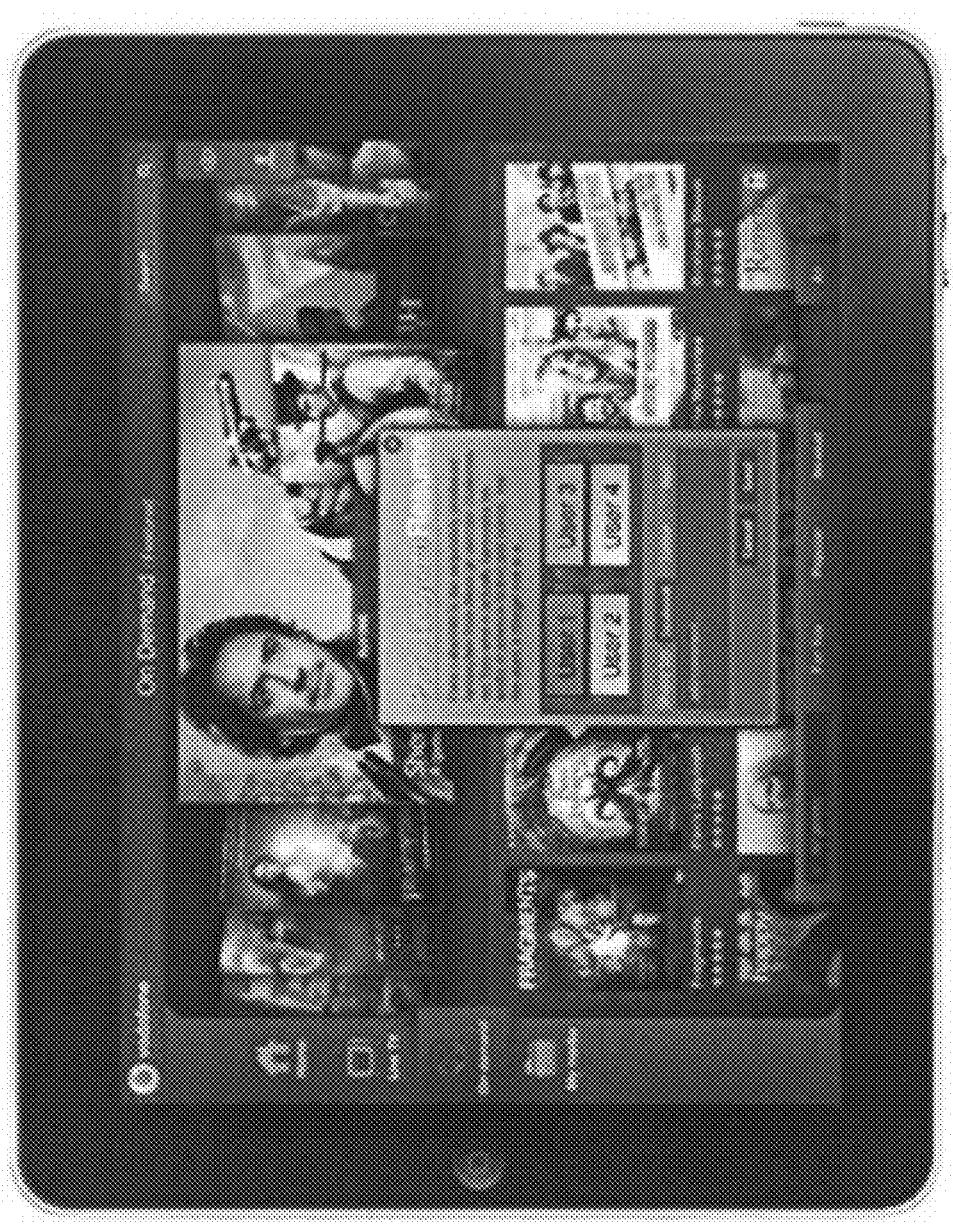

At 408, the pause event information characterizing the pause event is presented at the playback device. According to various embodiments, various techniques may be used to present the pause event information. For example, as is shown in FIG. 6, a playback bar control element may be presented for displaying information related to content playback. Pause point markers designating different pause points may then be imposed on the playback bar. As another example, as is shown in FIG. 7, a list of pause points may be included in a user interface for initiating playback of the content. As yet another example, a message may be displayed on a device that is associated with a particular pause point.

At 410, a selection of a pause event for initiating playback of the requested video content is received. According to various embodiments, the request may be received based on user input. For instance, a user may activate a touch screen, press a button, or click a mouse to select one of the pause events displayed at operation 408. Alternately, the selection may be made at least in part automatically. For instance, the selection may be generated automatically when a pause point is linked to a particular playback device and when a request to resume content playback is received from that playback device.

According to various embodiments, since several pause points may be associated with the same content item accessed via a content management account, a technique or mechanism may be used to ensure that a user does not inadvertently select an incorrect pause point. Inadvertently selecting an incorrect pause point may lead to the pause point being lost and the user or device with whom the pause point is actually associated no longer being able to resume playback from the pause point. Accordingly, a selection interface for pause points may require a personal identification number (PIN) or other such information in order to resume playback at a pause point. Alternately, or additionally, resuming playback from a pause point may require input provided from a personal playback device such as a mobile phone.

At 412, playback of the requested video content is initiated. As discussed herein, content may be received from a variety of sources and/or may be presented for playback at a variety of devices. When content is received via a streaming source, video content playback may be resumed by requesting the next unviewed segment of the video content for playback. When the video content is located on a local or remote storage device, content playback may be resumed by loading the video content and navigating to the time associated with the selected pause point.

Figure 5:
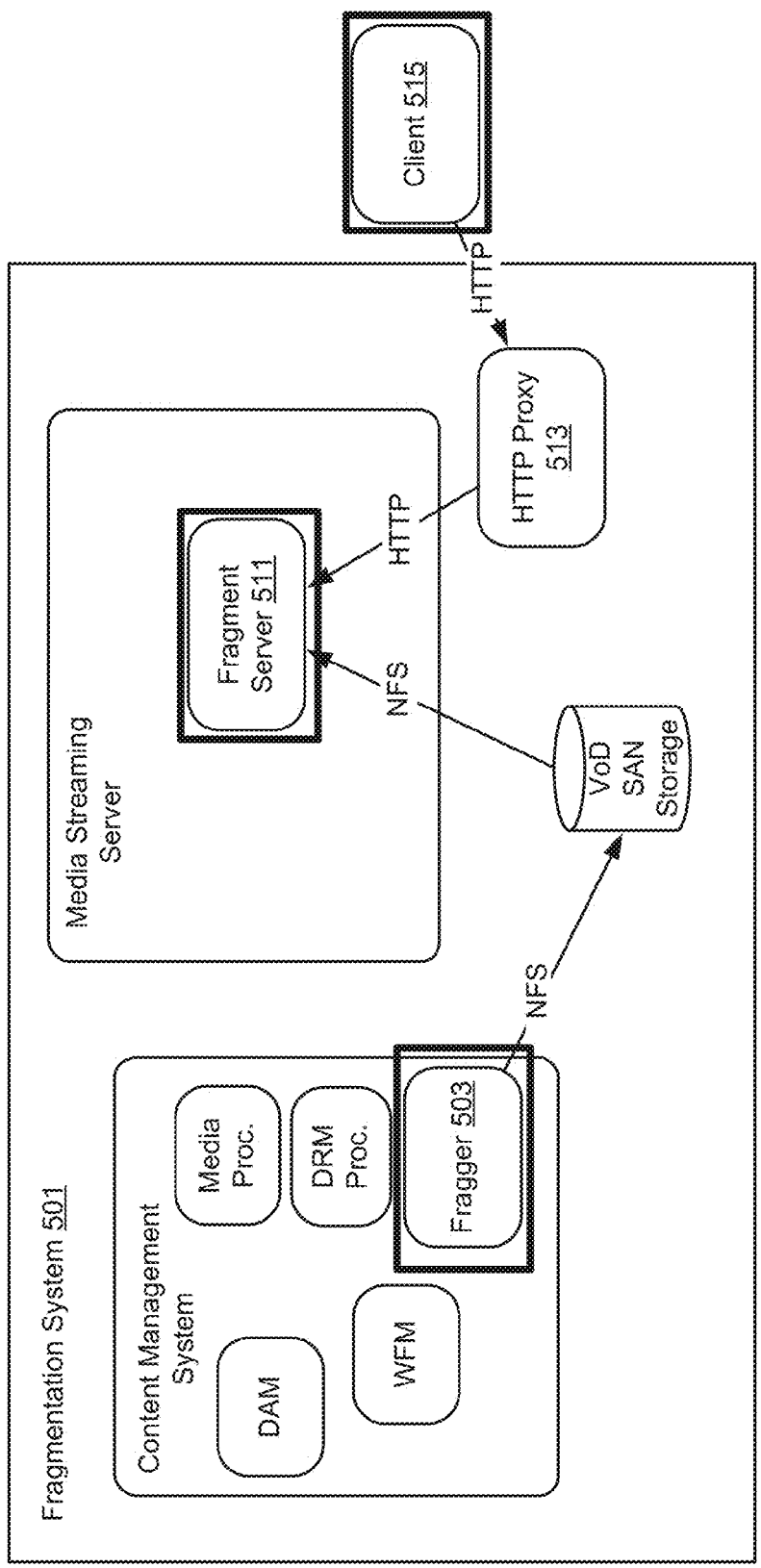
FIG. 5 illustrates another example of a media delivery system.

FIG. 5 illustrates one example of a fragmentation system 501 that can be used for video-on-demand (VoD) content. Fragger 503 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 511 provides the caching layer with fragments for clients. The design philosophy behind the client/server API minimizes round trips and reduces complexity as much as possible when it comes to delivery of the media data to the client 515. The fragment server 511 provides VoD content.

According to various embodiments, the client 515 uses a media component that requests fragmented MPEG-4 files, allows trick-play, and manages bandwidth adaptation. The client communicates with the application services associated with HTTP proxy 513 to get guides and present the user with the recorded content available.

FIGS. 6 and 7 illustrate examples of user interfaces that can be used with various techniques and mechanisms of the present invention. In FIG. 6, a video entitled "Sherlock Holmes" is playing on a tablet computer. However, according to various embodiments, video content may be presented on various types of content playback devices. The video playing on the tablet computer has superimposed on it a user interface for controlling playback. The user interface includes control elements for performing tasks such as adjusting the volume, playing the video, purchasing the video, and identifying the video as a favorite.

The user interface shown in FIG. 6 also includes a playback bar control element for showing information such as a total time length of the video content and a time marker corresponding to the current playback time relative to the total time length. In some user interfaces, a user may navigate to different times during the playback of the video content by clicking on the playback bar and/or dragging the time marker.

The playback bar in FIG. 6 includes pause point markers for pause points associated with four different user profiles. In FIG. 6, the pause point markers are labeled as "User 1" through "User 4". According to various embodiments, however, pause point markers may be labeled with user or device names, avatars, icons, or other such content. Each of the pause point markers is linked to a respective point on the playback bar. In this way, a user viewing the playback bar may readily identify the time at which playback was paused for each pause point.

In the example shown in FIG. 6, a user may select one of the four pause points by clicking it or by touching the display screen. According to various embodiments, however, various techniques may be used to select a pause point. For instance, a list of pause points may be presented in a popup window, and the user may select one of the listed pause points. When a pause point is selected, playback of the video content may be resumed at the time associated with the selected pause point.

In FIG. 7, a content navigation user interface is shown. In the user interface, the movie "Pan's Labyrinth" is selected. In the selection interface for the movie, a list of pause points is presented for resuming playback. As in FIG. 6, the pause points are labeled as "User 1" through "User 4". The user may select one of these pause points to resume playback at the time associated with the selected playback, as discussed with respect to FIG. 4.

According to various embodiments, a selection interface for pause points may be toggled on or off within the user interface. For instance, in some situations a user may wish to initiate playback from the beginning of a video without viewing playback resumed from a pause point.

Figure 8:
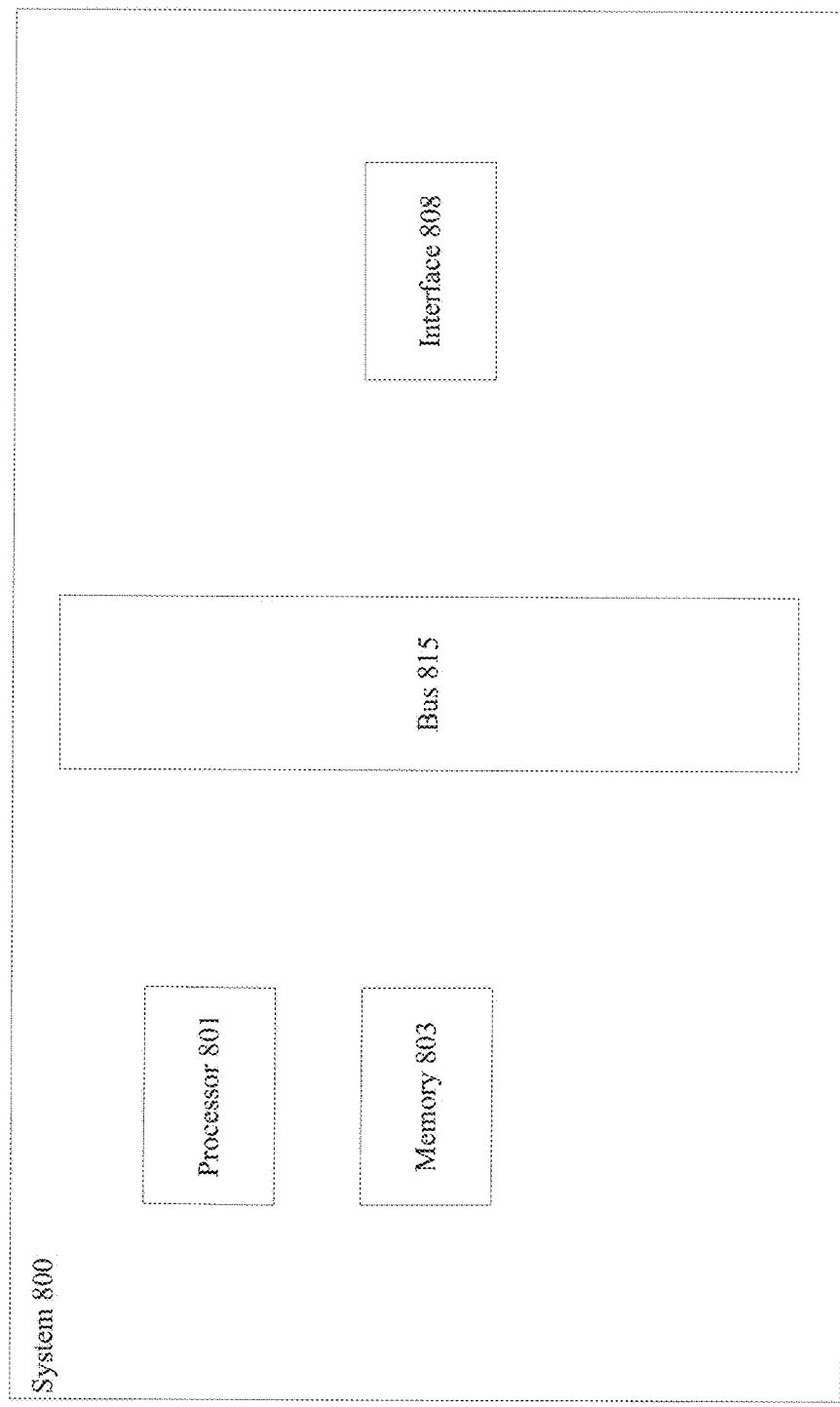
FIG. 8 illustrates one example of a system.

FIG. 8 illustrates one example of a server. According to particular embodiments, a system 800 suitable for implementing particular embodiments of the present invention includes a processor 801, a memory 803, an interface 808, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 808 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, FISSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 800 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verities the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
identifying, at a computing system, information characterizing a plurality of pause events associated with playback of a video content item for a content management account, each of the pause events identifying a time at which playback of the video content item was paused, the time being measured relative to the playback length of the video content item;
receiving a selection of one of the pause events at the computing system, the selected pause event identifying a designated time at which playback of the video content item was paused; and
transmitting an instruction to a client device to initiate playback of the video content item in accordance with the selected pause event at the client device, the video playback being initiated at the designated time.

2. The method recited in claim 1, wherein each of the pause events is associated with a respective one of a plurality of profiles associated with the content management account.

3. The method recited in claim 2, wherein receiving the selection of one of the pause events comprises receiving a selection of one of the profiles.

4. The method recited in claim 2, wherein selected ones of the plurality of profiles are each associated with a respective device linked with the content management account.

5. The method recited in claim 2, wherein selected ones of the plurality of profiles are each associated with a respective user associated with the content management account.

6. The method recited in claim 1, the method further comprising:
   transmitting an instruction to present a timeline corresponding with the video content item on a display screen at the client device.

7. The method recited in claim 6, wherein the timeline includes an indication of the selected pause event.

8. The method recited in claim 6, wherein the timeline includes an indication of two or more of the plurality of pause events.

9. The method recited in claim 1, wherein the content management account is authorized to view the video content item through an on-demand video streaming service.

10. The method recited in claim 1, wherein receiving the selection of one of the pause events comprises analyzing voice-based user input provided via a microphone.

11. The method recited in claim 1, wherein the client device is a mobile phone.

12. A system comprising:
   a storage device storing information characterizing a plurality of pause events associated with playback of a video content item for a content management account, each of the pause events identifying a time at which playback of the video content item was paused, the time being measured relative to the playback length of the video content item;
   a communications interface operable to receive from a client device a selection of one of the pause events at the computing system, the selected pause event identifying a designated time at which playback of the video content item was paused; and
   a processor operable to instruct the communications interface to transmit an instruction to the client device to initiate playback of the video content item in accordance with the selected pause event at the client device, the video playback being initiated at the designated time.

13. The system recited in claim 12, wherein each of the pause events is associated with a respective one of a plurality of profiles associated with the content management account.

14. The system recited in claim 12, wherein receiving the selection of one of the pause events comprises receiving a selection of one of the profiles.

15. The system recited in claim 12, wherein selected ones of the plurality of profiles are each associated with a respective device linked with the content management account.

16. The system recited in claim 12, wherein selected ones of the plurality of profiles are each associated with a respective user associated with the content management account.

17. The system recited in claim 12, wherein the processor is further operable to instruct the communications interface to transmit an instruction to present a timeline corresponding with the video content item on a display screen at the client device, wherein the timeline includes an indication of two or more of the plurality of pause events.

18. One or more non-transitory computer readable media having instructions stored thereon for performing a method, the method comprising:
   identifying, at a computing system, information characterizing a plurality of pause events associated with playback of a video content item for a content management account, each of the pause events identifying a time at which playback of the video content item was paused, the time being measured relative to the playback length of the video content item;
   receiving a selection of one of the pause events at the computing system, the selected pause event identifying a designated time at which playback of the video content item was paused; and
   transmitting an instruction to a client device to initiate playback of the video content item in accordance with the selected pause event at the client device, the video playback being initiated at the designated time.

19. The one or more non-transitory computer readable media recited in claim 18, wherein each of the pause events is associated with a respective one of a plurality of profiles associated with the content management account, and wherein receiving the selection of one of the pause events comprises receiving a selection of one of the profiles.

20. The one or more non-transitory computer readable media recited in claim 18, the method further comprising:
   transmitting an instruction to present a timeline corresponding with the video content item on a display screen at the client device, wherein the timeline includes an indication of the selected pause event.

* * * * *